United States Patent [19]

Gilmour, deceased

[11] 4,300,236

[45] Nov. 10, 1981

[54] RADIO SIGNALLING SYSTEMS

[75] Inventor: William D. Gilmour, deceased, late of Glastonbury, England, by Margaret Gilmour, executrix

[73] Assignee: Lewis Security Systems Limited, Surrey, England

[21] Appl. No.: 1,731

[22] Filed: Jan. 8, 1979

Related U.S. Application Data

[63] Continuation of Ser. No. 778,150, Mar. 16, 1977, Pat. No. 4,162,448.

[51] Int. Cl.³ .................... H04L 27/00; H04B 12/00
[52] U.S. Cl. .................................. 375/23; 328/136; 340/539; 340/825.63; 340/825.69
[58] Field of Search ............ 455/49; 340/539, 171 A, 340/311, 167 A, 694, 695; 328/136; 455/49, 53, 54, 95, 100, 128, 39; 375/21, 22, 23, 24, 37, 41, 68, 70; 370/8, 93; 178/66.1, 66.2

[56] References Cited

U.S. PATENT DOCUMENTS

| | | | |
|---|---|---|---|
| 3,197,563 | 7/1965 | Hamsher et al. | 370/93 |
| 3,440,353 | 4/1969 | Salmet | 375/23 |
| 3,634,824 | 1/1972 | Zinneta | 340/167 A |
| 3,902,478 | 9/1975 | Konopasek et al. | 340/539 |
| 4,005,428 | 1/1977 | Graham | 375/71 |
| 4,047,107 | 9/1977 | Dickinson | 375/22 |

Primary Examiner—Marc E. Bookbinder
Attorney, Agent, or Firm—Oblon, Fisher, Spivak, McClelland & Maier

[57] ABSTRACT

This invention is a radio frequency identity system in which each user has a token containing a low power transmitter. If he wants to enter a security area, a receiver operates to let him enter if it recognizes that the transmission is correct. A correct transmission is one having a set number of R.F. carrier cycles between successive modulation pulses.

In an alarm system a user can identify himself in a similar manner.

8 Claims, 3 Drawing Figures

RADIO SIGNALLING SYSTEMS

This is a continuation, of application Ser. No. 778,150 filed Mar. 16, 1977, now U.S. Pat. No. 4,162,448.

BACKGROUND OF THE INVENTION

This invention relates to radio signalling systems where it is necessary to be able to distinguish between different individuals.

One application of such a system is where any one of a number of individuals for example, old people may wish to summon assistance and it is necessary for someone at the receiver to be able to identify which person caused the alarm. Another application is where only certain people are to have access to a security area and it is necessary for a receiver to be able to distinguish between those people and other people.

In each case each person using the system can have a portable pocket token for generating radio signals when assistance is required or when access to the security area is required as the case may be.

SUMMARY OF THE INVENTION

An object of the invention is to provide a particularly simple and economical way of distinguishing between different pocket tokens even when there are a large number of tokens in the system.

According to the present invention a radio signalling system includes a number of portable tokens each capable of transmitting the signals in the form of bursts of carrier frequency separated by modulation pulses, the number of cycles in each burst being characteristic of that token, and a receiver capable of distinguishing between received signals from tokens with different characteristic numbers of cycles in their bursts.

Thus distinction between different individuals or different tokens is provided merely by different numbers of carrier frequency cycles between successive modulation pulses which merely serve to limit the period over which the cycles are to be counted, and can also operate logic circuits both in the transmitters and in the receiver.

The system is thus very simple and yet enables very large numbers of people to use the system because the separation between channels, that is to say between the numbers of carrier frequency cycles in bursts of similar tokens can be quite small. In spite of that the equipment is quite economical in manufacture.

For example a permissible range of frequencies is 50 KHz–150 KHz and as a 5 KHz separation between carrier frequencies is satisfactory, there are 20 frequencies available. A 6-bit binary counter has a count of 64, and a preliminary multi-bit binary counter may be used as a divider of carrier cycles for driving the 6-bit counter. That would give 20×64 or 1280 'differs' on the system.

A suitable transmitter output power is 5 milliwatts, which would not cause substantial drain on the token batteries, nor unacceptable interference outside the area where the system is being used.

BRIEF DESCRIPTION OF THE DRAWINGS

The invention may be carried into practice in various ways and three embodiments will now be described by way of example with reference to the accompanying drawings in which.

DESCRIPTION OF THE PREFERRED EMBODIMENTS

In both embodiments each user of the system has a portable token containing a simple radio transmitter working on a common radio frequency channel, and arranged to modulate a radio frequency by a 1 millisecond pulse at regular intervals of a certain number of radio frequency cycles, the particular number being unique to that user or to the users in a particular group of users. In the example being described the modulation is amplitude modulation, but it could equally well be phase or frequency modulation.

The user may switch his transmitter on manually when he wants to obtain access to a secure area or when he wants to give an alarm as the case may be, and the modulated radio frequency is transmitted from a suitable integral aerial. Alternatively the transmitter could be left on continuously.

Figure 1:
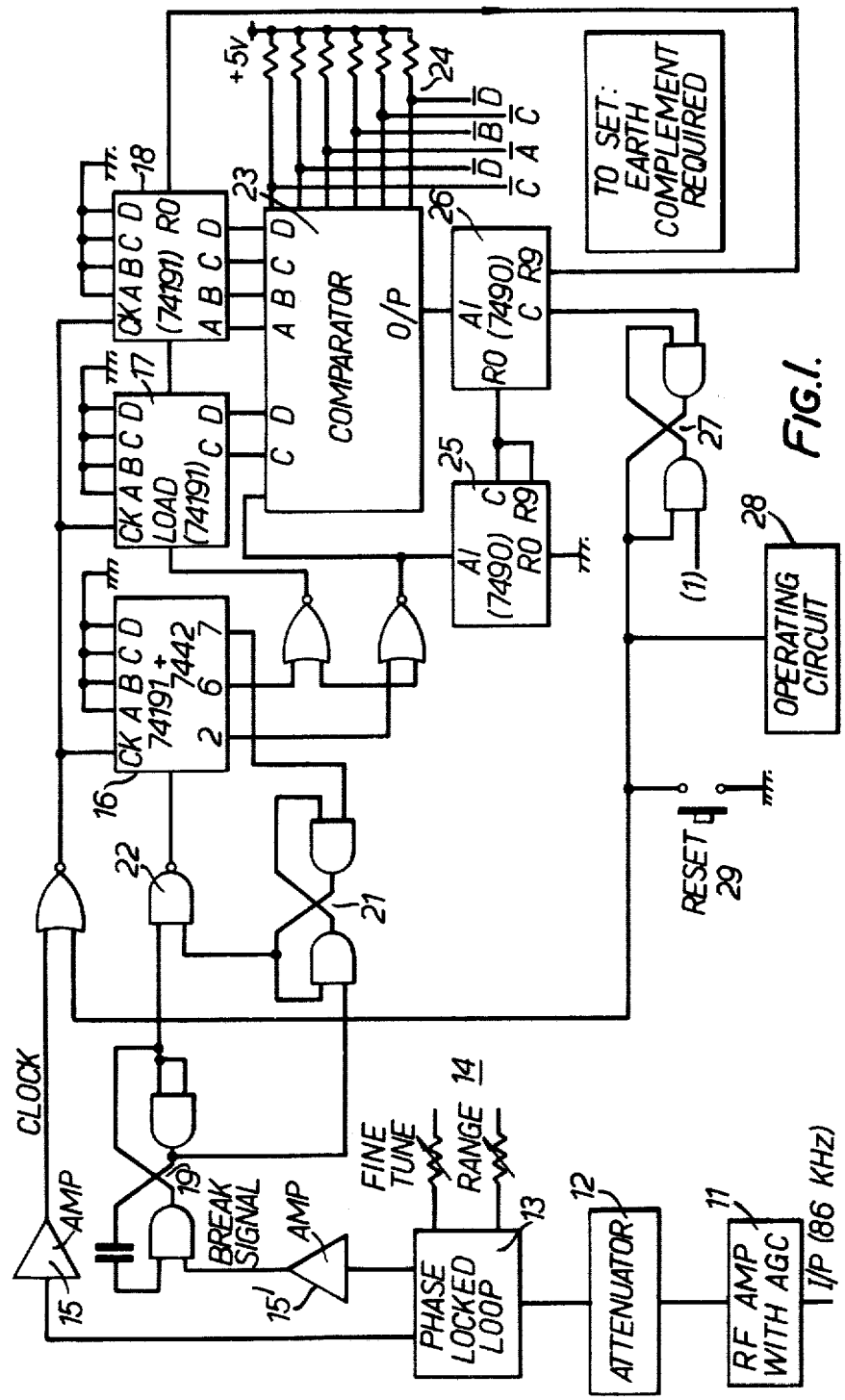
FIGS. 1 and 2 are respective logic circuits for an access system and an alarm system.

Signals are received by an inductive loop signalling band or by some other convenient means and supplied to a receiver which in the case of the access system is arranged in accordance with FIG. 1 to determine if the number of radio frequency cycles received between successive modulation pulses agrees with a pre-set number in which case an operating circuit releases the entrance to the prohibited area.

The received signals are amplified with automatic gain control at 11 attenuated at 12 and fed into a phase-locked loop system 13 having fine and coarse tuning means.

The received radio frequency cycles or a known sub-multiple or difference frequency from them are amplified at 15 and used as clock pulses for driving a series of binary coded decimal counters 16, 17 and 18, and control of the first counter 16 is by means of a monostable circuit 19, a flip-flop 21 and a NAND gate 22. A received modulation pulse is amplified at 15' triggers the monostable circuit 19 and that is arranged to provide an input to the NAND gate ready for re-setting the first counter 16 which receives clock pulses and provides control signals for the remainder of the system.

The first control signal is obtained from the 2 output of the counter 16 and enables a comparator 23 which compares the count achieved on the later counters 17 and 18 in the previous burst of carrier radiation between pulses with the pre-set count as set at 24. The first control signal is also fed to a decade counter 25 for counting the number of comparisons made. If the comparator 23 shows coincidence, the count of a counter 26 is increased but if it does not show coincidence, the count is decreased and when the count of the counter 26 reaches 4 showing that 4 successful comparisons have been made, a flip-flop 27 is operated which controls operation of a circuit 28 for giving access to the security area.

The second control signal from the number 6 output of the counter 16 renders the counter 17 receptive to clock pulses and an output from that counter 17 in turn renders the counter 18 receptive, so that the total count of clock pulses in the interval between two successive modulation pulses is recorded on the two most significant stages C.D of the counter 17 and the A.B.C.D. stages of the counter 18 for subsequent comparison with the pre-set value in the comparator 23. The comparison is made from the 2 output of the counter 16 before the counters 17 and 18 are re-set from the 6 output of the counter 16 and start to be refilled. The 7 output from the counter 16 is used to re-set the flip-flop 21 to provide an input to the NAND gate 22 to re-set the counter 16 when it has fulfilled its function.

A re-set button 29 disconnects the circuit 28 and resets the circuit ready for the next operation.

Figure 2:
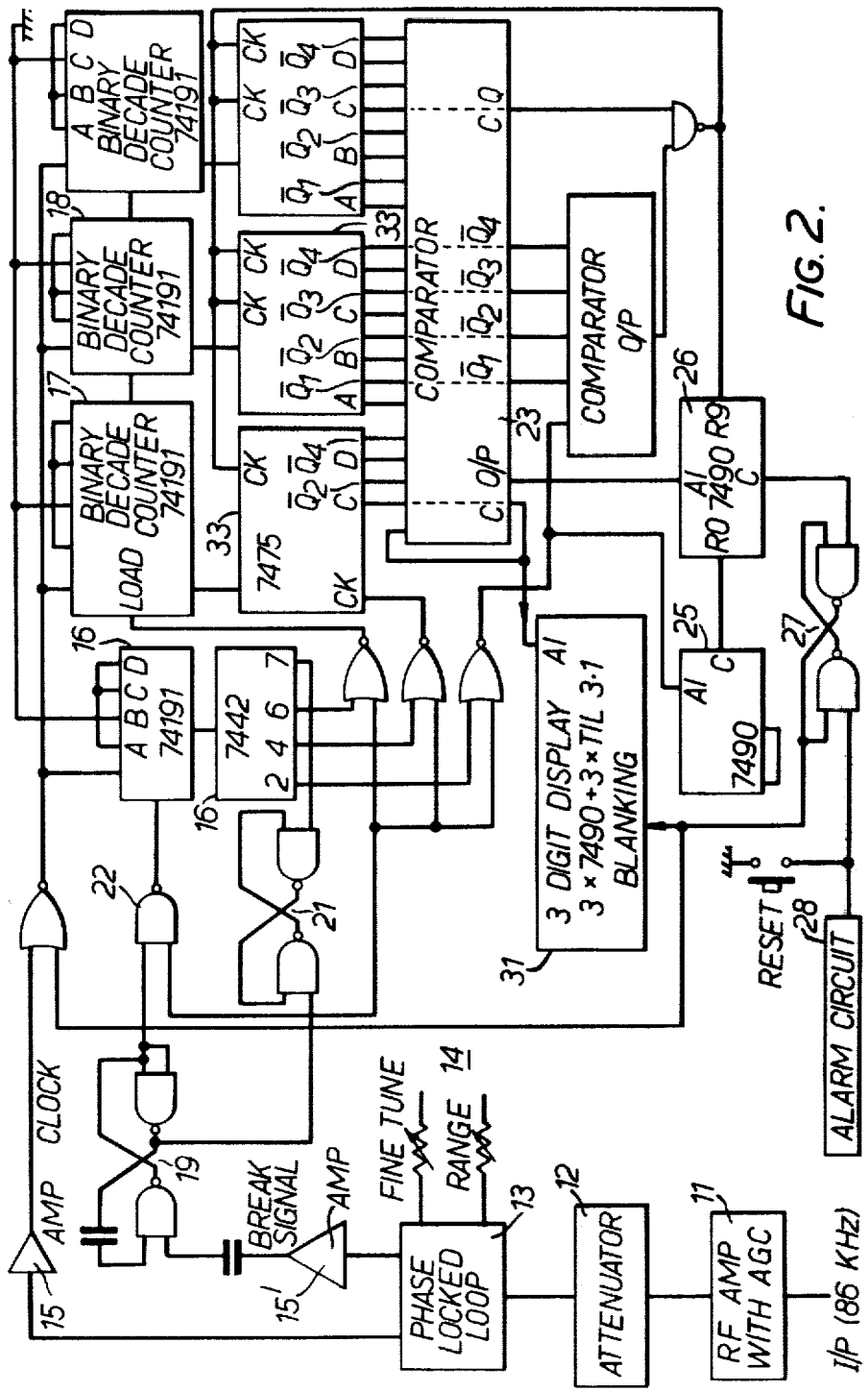

The logic circuit shown in FIG. 2 for a receiver for the alarm system is very similar to the circuit described with reference to FIG. 1 and corresponding components have been given the same numerals. In this case however instead of operating an entrance to a security area, it is desired to give a warning and a display of the identity of the individual whose token initiated the alarm. The token must only be operated when an alarm is required. The alarm circuit corresponds with the operating circuit 28 in FIG. 1 but the identity display is given on a 3 digit display unit 31 which receives a count for determining the display from the counter 17 by way of the comparator 23 at its A1 input.

However, the display is only given when a blanking signal is removed in response to operation of the flip-flop 27 after the counter 26 has shown that 4 successful comparisons have been made. In this case the comparison is not with a pre-set number, but with the count in the preceding sample.

Thus after each sample of radio frequency transmission the count achieved on the counters 17 and 18 is transferred to a store 33 in response to a signal from the number 4 output of the counter 16. The next count is compared at 23 with the stored count and if identity is shown, an output signal increases the count of the counter 26 in the same way as described with reference to FIG. 1.

A number of refinements may be added to the basic circuit; counts of less or more than a present value on the subsequent counting stages can be deemed present due to interference and the sample ignored or a decrement applied to the final counter. A tuning indicator can be provided consisting of an exclusive or gate connected to the outputs of the two binary stages immediately prior to the least significant active stage. If modulating pulses are nicely centred in their channel an output will be present at this gate and can be used to illuminate a 'tuned' indicator.

Each transmitter can be provided with two modulating counts, preferably on adjacent channels, so that a final response at the receiver of an odd count represents an alarm of higher urgency than an even count (or vice versa). In the display the least significant active count bit is not displayed as count, but as 'degree of urgency'.

The re-set button in the access system of FIG. 1 could be a timing circuit to automatically reset the system after a pre-set time, irrespective of whether access had been gained or not.

Figure 3:
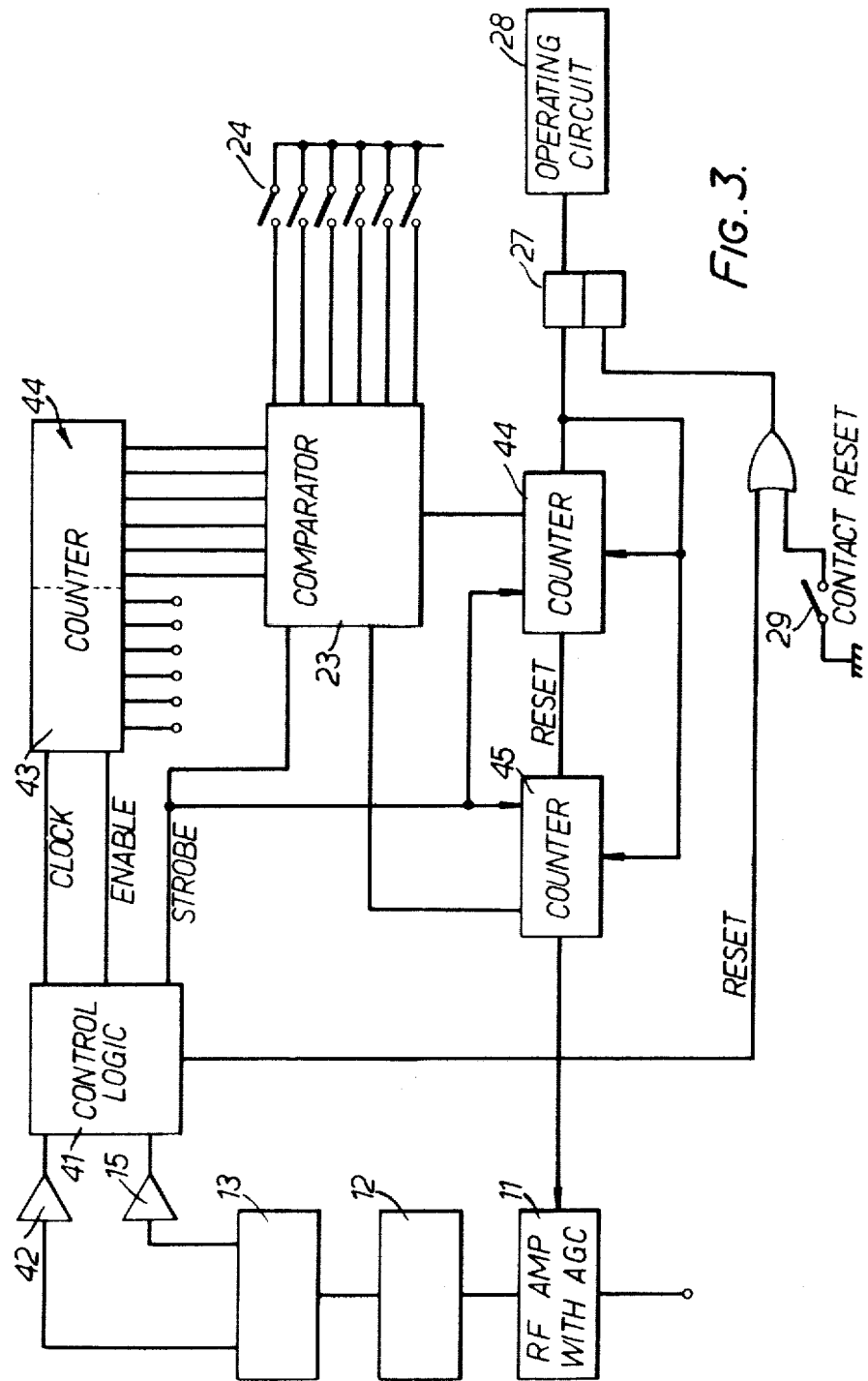
FIG. 3 is a circuit for an alternative access system.

In the simplified version of FIG. 1 shown in FIG. 3 similar numerals have been used for similar components.

The radio-frequency cycles amplified at 42 are used in a control logic arrangement 41 to provide clock pulses for counting by the counter 43 which is a 12 bit binary counter, the last six units 46 of which are used to provide a count for comparison. Thus 64 cycles are received before the counter 46 increases its count by 1, and the counter 46 has a total count of 26 or 64.

The first few cycles at 42 after a modulation pulse at 15 are used as timing sequence control signals from the control logic 41, and do not affect the count of the counter 46.

The first control signal enables the comaprator 23 which compares the count achieved on the counter 46 in the previous burst of carrier radiation with the pre-set count as set at 24. The first control signal is also fed to counters 44 and 45. If comparator 23 shows coincidence the count of counter 44 is increased. If the comparator does not show coincidence the count at counter 45 is increased. When the count on counter 44 reaches four, showing that four successful comparisons have been made, the flip-flop 27 is operated which controls operation of the circuit 28 for controlling an external mechanism.

If the count on counter 45 passes a pre-set value, indicating that several incorrect comparisons have been made, counter 44 will be re-set to zero and also an AGC circuit at RF amplifier 11 will be actuated to desensitize the input.

The second control signal from the control logic 41 renders the counter 43 receptive to clock pulses so that the total count of clock pulses in the interval between two successive modulation pulses is recorded and 1/64th of that count is recorded, on the six most significant stages of counter 43—the counter 46—for subsequent comparision with the pre-set value at 24 in the comparator 23. The comparision is made on the first output of the control logic before the counters are re-set and start to be refilled from the second output of the control logic.

The third output of the control logic is used to re-set the control logic to prepare for the reception of the next modulation pulse. A reset push-button 29 or a timing circuit disconnects the circuit 28 and resets the circuitry ready for the next operation.

What I claim as my invention and desire to secure by Letters Patent is:

1. A radio signalling system including a number of portable tokens each capable of transmitting signals in the form of a carrier frequency which is common to the tokens, with spaced modulation pulses superimposed on the carrier and defining carrier bursts between successive of said pulses, the number of carrier frequency cycles in said carrier bursts between successive modulation pulses being different for different tokens, and a receiver including a carrier cycle counter and capable of distinguishing between received signals from tokens with different characteristic numbers of cycles in their bursts, wherein for any one token the number of carrier frequency cycles is the same in each burst of transmitted signals.

2. A system as claimed in claim 1 in which each token is small enough to go in a user's pocket.

3. A system as claimed in claim 2 wherein each token includes a manual switch for causing the token to start transmitting.

4. A system as claimed in claim 1 in which the carrier frequency is a radio frequency.

5. A system as claimed in claim 4 in which the carrier cycle counter includes a counter of clock pulses derived from the cycles in bursts of received carrier frequency.

6. A system as claimed in claim 5 in which the receiver includes a comparator of the count achieved by the counter which comparator is arranged to compare the achieved count with a pre-set count identifying tokens to which access is to be given to a security area.

7. A system as claimed in claim 6 in which the receiver is arranged in response to a successful comparision to operate a release mechanism to a security area.

8. A radio signalling system including a number of portable tokens each capable of transmitting signals in the form of a carrier radio frequency which is common to the tokens, with spaced modulation pulses superimposed on the carrier and defining, for each token, carrier bursts between successive of said pulses, the number of carrier frequency cycles in said carrier bursts between successive modulation pulses being different for different tokens, and a receiver capable of distinguishing between received signals from tokens with different characteristic numbers of cycles in their bursts, said receiver comprising first means for determining the number of cycles in one burst of received carrier frequency, and second means for identifying tokens to which access is to be given to a security area based on the number of cycles in said one burst and the number of cycles determined by said first means in a burst of received carrier frequency preceding said one burst.

* * * * *